(12) United States Patent
Shin et al.

(10) Patent No.: US 9,274,787 B2
(45) Date of Patent: Mar. 1, 2016

(54) METHOD AND SYSTEM FOR UPDATING FIRMWARE ON A BEACON DEVICE AND A COMMUNICATION UNIT BROADCASTING BEACON SIGNAL

(71) Applicant: SK PLANET CO., LTD., Gyeonggi-Do (KR)

(72) Inventors: Chul Yong Shin, Seoul (KR); Jae Hyung Huh, Gyeonggi-Do (KR)

(73) Assignee: SK PLANET CO., LTD. (KR)

( * ) Notice: Subject to any disclaimer, the term of this patent is extended or adjusted under 35 U.S.C. 154(b) by 0 days.

(21) Appl. No.: 14/623,131

(22) Filed: Feb. 16, 2015

(65) Prior Publication Data

US 2015/0324186 A1 Nov. 12, 2015

(30) Foreign Application Priority Data

May 12, 2014 (KR) .................. 10-2014-0056814

(51) Int. Cl.
*G06F 9/44* (2006.01)
*G06F 9/445* (2006.01)

(52) U.S. Cl.
CPC ... *G06F 8/65* (2013.01); *G06F 8/71* (2013.01)

(58) Field of Classification Search
USPC .................................. 717/168–174; 709/203
IPC ........................................ G06F 8/65,8/70, 8/71
See application file for complete search history.

(56) References Cited

U.S. PATENT DOCUMENTS

| | | | | |
|---|---|---|---|---|
| 7,213,048 B1* | 5/2007 | Parupudi | ........... | G06F 17/30241 455/456.1 |
| 7,565,649 B2* | 7/2009 | Sasabe | ...................... | G06F 8/65 717/168 |
| 7,600,006 B2* | 10/2009 | Willess | ..................... | G06F 8/61 709/221 |
| 7,676,804 B2* | 3/2010 | Ferguson | ............... | B66C 13/18 717/168 |
| 7,814,478 B2* | 10/2010 | Friedman | ...................... | 717/173 |
| 8,250,562 B2* | 8/2012 | Doraisamy | ............... | G06F 8/65 717/168 |
| 8,266,615 B2* | 9/2012 | Shapiro | ..................... | G06F 8/61 717/169 |

(Continued)

OTHER PUBLICATIONS

Law et al, "Secure Rateless Deluge: Pollution-Resistant Reprogramming and Data Dissemination forWireless Sensor Networks", Hindawi Publishing Corporation EURASIP Journal onWireless Communications and Networking, vol. 2011, Article ID 685219, pp. 1-22, 2011.*

(Continued)

*Primary Examiner* — Anil Khatri
(74) *Attorney, Agent, or Firm* — Baker Hostetler LLP

(57) ABSTRACT

Method and system for updating firmware on a beacon device. The system includes: a communication unit and a control unit. The system broadcasts a beacon signal within a certain radius and exchanges information with the service device and the control unit and inquires of the service device about a firmware program version at a predetermined period basis by receiving the firmware program version from the service device and comparing a preset firmware program version with the received firmware program version for controlling the communication unit to stop broadcasting of the beacon signal if both versions are different from each other. The system also requests the service device to update the firmware program through the communication unit, and installs the firmware program received from the service device through the communication unit.

11 Claims, 5 Drawing Sheets

(56) References Cited

U.S. PATENT DOCUMENTS

| | | | | |
|---|---|---|---|---|
| 8,387,112 | B1* | 2/2013 | Ranjan | G06F 21/57 717/168 |
| 8,463,319 | B2* | 6/2013 | Budampati et al. | 455/552.1 |
| 8,559,974 | B2* | 10/2013 | Alizadeh-Shabdiz | G01S 5/0278 342/457 |
| 8,607,222 | B2* | 12/2013 | Lee | 717/173 |
| 8,667,144 | B2* | 3/2014 | Dharmaraju | H04W 8/005 709/203 |
| 8,826,265 | B2* | 9/2014 | Vedantham | G06F 8/665 717/170 |
| 8,839,224 | B2* | 9/2014 | Adler et al. | 717/168 |
| 8,938,730 | B2* | 1/2015 | McDonald | G06F 11/1433 709/203 |
| 8,996,924 | B2* | 3/2015 | Maejima | 714/48 |

OTHER PUBLICATIONS

Conradi et al, "Version Models for Software Configuration Management", ACM Computing Surveys, vol. 30, No. 2, pp. 232-282, 1998.*

Hosek et al, "Safe Software Updates via Multi-version Execution", IEEE, pp. 612-621, 2013.*

Cadar et al, "Multi-version Software Updates", IEEE, pp. 36-40, 2012.*

Li et al, "VIPER: Verifying the Integrity of PERipherals' Firmware", ACM, pp. 3-16, 2011.*

Shah et al, "Implementation of a Directional Beacon-Based Position Location Algorithm in a Signal Processing Framework", IEEE Transactions on Wireless Communications, vol. 9, No. 3, pp. 1044-1053, 2010.*

* cited by examiner

METHOD AND SYSTEM FOR UPDATING FIRMWARE ON A BEACON DEVICE AND A COMMUNICATION UNIT BROADCASTING BEACON SIGNAL

CROSS-REFERENCE TO RELATED APPLICATION

This application claims the benefit of Korean Application No. 10-2014-0056814, filed on May 12, 2014, with the Korean Intellectual Property Office, the disclosure of which is incorporated herein by reference.

BACKGROUND OF THE INVENTION

1. Field of the Invention

Method for updating firmware on a beacon device, a beacon device and a system using the method are disclosed. The method is capable of allowing a beacon device to determine whether a firmware on the beacon device is required to be updated. The beacon device stops broadcasting of a beacon signal being currently broadcast, if it is determined that the firmware application is required to be updated, and the firmware on the beacon device is updated.

2. Description of the Related Art

This section is just to provide background information for embodiments of the present invention but does not constitute any prior art.

A beacon device is installed at various sites depending on its purpose and provides a specified service to user terminals. In other words, the beacon device broadcasts a beacon signal within a certain radius according to a Bluetooth protocol system, is connected to the user terminals which scan this beacon signal, and provides the user terminals with a variety of information such as information on goods advertisement, discount coupons and so on to user terminals entering a store, and location-based services for checked user locations in a store.

Programs quipped in such a beacon device may be changed in terms of their functions depending on service requirements. However, in order to update programs equipped in current beacon devices, a manager who manages the beacon devices has to move to sites where the beacon devices are installed and has to connect the beacon devices to a computer to update the programs.

This is a high-expensive and time-consuming task to update programs of the beacons devices with increased number of beacon devices.

RELATED TECHNICAL DOCUMENT

Patent Document

Korean Patent Application Laid-Open No. 10-2007-0094078 (titled as: "Method for automatically updating programs of Bluetooth devices, published on Sep. 20, 2007)

SUMMARY OF THE INVENTION

To overcome the above problems, it is an object of the present invention to provide a method for updating a firmware in a beacon device, which is capable of allowing a beacon device to determine whether a firmware application is required to be updated, stop broadcasting of a beacon signal being currently broadcast if it is determined that the firmware application is required to be updated, and update the firmware program, and a beacon device and system using the same However, the object of the present invention is not limited thereto but other non-mentioned objects will be apparent to those skilled in the art when reading the following description.

To achieve the above object, according to an aspect of the invention, there is provided a beacon device including: a communication unit which broadcasts a beacon signal within a certain radius and exchanges information with a service device; and a control unit which inquires of the service device about a firmware program version at a predetermined period basis through the communication unit, receives the firmware program version from the service device, compares a preset firmware program version with the received firmware program version, controls the communication unit to stop broadcasting of the beacon signal being broadcast within the certain radius if both versions are different from each other, requests the service device to update the firmware program through the communication unit, and installs the firmware program received from the service device through the communication unit.

In some embodiments, the communication unit may include: a first communication module which broadcasts the beacon signal within the certain radius, scans the broadcast beacon signal and exchanges information with connected one or more terminals; and a second communication module which exchanges information with the service device.

In some embodiments, the control unit may inquire of the service device about the firmware program version at more than a preset period if a service is being provided to the one or more terminals through the communication unit, and receive the firmware program version from the service device, and, otherwise, inquire of the service device about the firmware program version at less than the preset period, and receive the firmware program version from the service device.

In some embodiments, the control unit may compare a preset firmware program version with the received firmware program version, stop broadcasting of the beacon signal if both versions are different from each other and if a service is being provided to one or more terminals through the communication unit, wait until the service provision to the terminals is completed, request the service device to update the firmware program when the service provision is completed, and, otherwise, request the service device to update the firmware program at the same time of stopping the broadcasting of the beacon signal.

In some embodiments, if the control unit is connected to the one or more terminals through the communication unit although no service is provided to the one or more terminal, the control unit may request the service device to update the firmware program after terminating the connection to the terminals by force.

In some embodiments, when the reception of the firmware program from the service device is completed, the control unit may install the received firmware program, restart to check whether or not the firmware program is normally operated, and delete an existing firmware program if the firmware program is normally operated.

In some embodiments, the control unit may control the communication unit to broadcast the stopped beacon signal after installing the firmware program.

According to another aspect of the invention, there is provided a firmware updating system including: a service device which manages one or more beacon devices and manages a firmware program which can be provided to the beacon devices; and a beacon device which inquires of the service device about a firmware program version at a predetermined period basis, receives the firmware program version from the service device, compares a preset firmware program version with the received firmware program version, stops broadcasting of a beacon signal being broadcast within a certain radius if both versions are different from each other, requests the service device to update the firmware program, and installs the firmware program received from the service device.

According to another aspect of the invention, there is provided a beacon firmware updating method including: by a beacon device, inquiring of a service device about a firmware program version at a predetermined period basis; by the beacon device, receiving the firmware program version from the service device; by the beacon device, comparing a preset firmware program version with the firmware program version received from the service device; by the beacon device, stopping broadcasting of a beacon signal being broadcast within a certain radius if both versions are different from each other and requesting the service device to update the firmware program; and by the beacon device, installing the firmware program received from the service device.

In some embodiments, the act of inquiring of a service device about a firmware program version may include inquiring of the service device about the firmware program version at more than a preset period if the beacon device is providing a service to one or more terminals and, otherwise, inquiring of the service device about the firmware program version at less than the preset period.

In some embodiments, the act of requesting the service device to update the firmware program may include stopping the broadcasting of the beacon signal if the beacon device is providing a service to one or more terminals, waiting until the service provision to the terminals is completed, requesting the service device to update the firmware program when the service provision is completed, and, otherwise, requesting the service device to update the firmware program after stopping the broadcasting of the beacon signal.

In some embodiments, the act of requesting the service device to update the firmware program may include, if the beacon device is connected to one or more terminals although no service is provided to the one or more terminal, requesting the service device to update the firmware program after terminating the connection to the terminals by force.

In some embodiments, the act of installing the firmware program may include: by the beacon device, when the reception of the firmware program from the service device is completed, installing the firmware program received from the service device; by the beacon device, performing restart; by the beacon device, checking whether or not the firmware program received from the service device is normally operated; and by the beacon device, deleting an existing firmware program if the received firmware program is normally operated.

In some embodiments, the beacon firmware updating method may further include: by the beacon device, starting broadcasting of the stopped beacon signal after the act of installing the firmware program.

According to another aspect of the invention, there is provided a non-transitory computer-readable storage medium storing a computer program comprising a set of instructions, when executed, arranged to cause a computer to implement the above-described methods.

According to the beacon firmware updating method and the beacon device and system using the same of the present invention, since the beacon device determines whether or not the firmware program update is required, stops the broadcasting of the beacon signal being currently broadcast if it is determined that the firmware program update is required, and updates the firmware program, it is possible to update the firmware program of the beacon device with more ease.

In addition, according to the present invention, when the beacon device is providing a service to a terminal of a particular user, since the beacon device updates the firmware program after waiting such that the service provided to the user terminal is not stopped, it is possible to update the firmware program with higher efficiency.

In addition, since an inquiry period can be adjusted depending on conditions of the beacon device 10, it is possible to update the firmware program with higher efficiency.

The above and other advantages will be explicitly or implicitly apparent from the following description.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
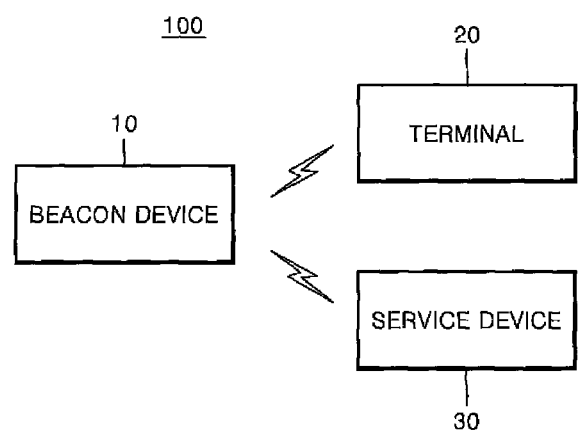
FIG. 1 is a schematic configuration view of a firmware update system according to an embodiment of the present invention.

Hereinafter, preferred embodiments of the present invention will be described in detail with reference to the accompanying drawings so that those skilled in the art can easily practice the preferred embodiments. In the following detailed description of the present invention, concrete description on related functions or constructions will be omitted if it is deemed that the functions and/or constructions may unnecessarily obscure the gist of the present invention. Accordingly, embodiments described in the specification and elements shown in the drawings are illustrative only and do not cover all of the technical ideas of the present invention. It should be, therefore, understood that these embodiments and elements may be replaced with different equivalents and modifications at the point of time of filing the present application.

In addition, as used herein, ordinal numbers such as 'first', 'second' and the like are used to distinguish between one element and another but are not used to limit these elements. For example, without departing from the scope of the invention, a second element may be named a first element and vice versa.

In addition, when it is stated that an element is "connected" or "coupled" to another element, it means that these elements are logically or physically connected or coupled to each other. In other words, it should be understood that an element is connected or coupled to another element directly or with a different element interposed therebetween, i.e., indirectly.

In addition, terminologies used herein are only used to explain particular embodiments but are not intended to limit the scope of the invention. A singular form is intended to include a plural form. In the specification, the term "including" or "having" is use to specify features, numbers, steps, actions, components, parts and combinations thereof but is not intended to exclude other additional features, numbers, steps, actions, components, parts and combinations thereof.

A beacon firmware updating method and a beacon device and a system using the same according to embodiments of the present invention will now be described with reference to the drawings. Throughout the drawings, the same elements are denoted by the same reference numerals and therefore, explanation of which will not be repeated.

FIG. 1 is a schematic configuration view of a firmware update system according to an embodiment of the present invention.

Referring to FIG. 1, a firmware update system 100 according to an embodiment of the present invention may include a beacon device 10, a terminal 20 and a service device 30. Although not shown, the system 100 may include a communication network for supporting exchange of information between the beacon device 10 and the terminal 20 and between the beacon device 10 and the service device 30.

These components will be described below in brief. First, the beacon device 10 broadcasts a beacon signal through local wireless communication, scans the beacon signal, and provides a specified service to the connected terminal 20. Preferably, the beacon device 1 may broadcast the beacon signal according to a BLE (Bluetooth Low Energy) communication protocol. The beacon device 10 may be installed in a room such as a store and can broadcast the beacon signal within a certain radius from 5 cm to 49 m.

The beacon device 10 has a firmware program for processing and managing information (for example, advertisement, position-based services and so on) serviced by the device 10. The firmware program contains information essential to drive the beacon device 10. In particular, the beacon device 10 according to an embodiment of the present invention can determine whether or not the firmware program is to be updated, and, if it is determined that the firmware program is to be updated, receive and install the firmware program updated from the service device 30 storing and managing the firmware program.

To this end, the beacon device 10 of the present invention can inquire of the service device 30 about a firmware program version at a certain period basis, receive the firmware program version from the service device 30, and compare the received firmware program version with a preset firmware program version. If both firmware program versions are different from each other, the beacon device 10 can stop the broadcasting of the beacon signal being broadcast with the certain radius and request the service device 30 to update the firmware program. Upon receiving the updated firmware program from the service device 30, the beacon device 10 can install the received firmware program.

The terminal 20 refers to a user device which can transmit/receive various types of data via the communication network according to a manipulation from a user. The terminal 20 can conduct voice or data communication via the communication network. In particular, the terminal 20 according to an embodiment of the present invention can scan and receive the beacon signal broadcast from the beacon device 10 within the certain radius. At this time, the terminal 20 can extract identification information of the beacon device 10 from the beacon signal and transmit response information to the beacon device 10 in response to the extracted identification information. Through this procedure, the terminal 20 can be connected to the beacon device 10. Then, the terminal 20 can receive a variety of designated information, such as coupons and discount information related to the current position, from the beacon device 10. The beacon device 10 can calculate position information of the terminal 20 and the terminal 20 can use position-based services related to the position information.

To this end, the terminal 20 of the present invention may include a memory storing a browser, programs and protocols for information transmission/reception, a microprocessor for executing various programs to perform calculation and control, and so on. The terminal 20 may be implemented with mobile terminals such as a smart phone, a tablet PC, a PDA (Personal Digital assistants), a PMP (Portable Multimedia Player), a MP3 player and so on.

The service device 30 manages the beacon device 10 according to an embodiment of the present invention and stores and manages a firmware program which can be provided to the beacon device 10. The service device 30 can update the firmware program consistently and manage a version of the updated firmware program.

In particular, the service device 30 according to an embodiment of the present invention can receive a query for the firmware program version from the beacon device 10 at a certain period basis and provide information on the firmware program version to the beacon device 10 in response to the query. In addition, the service device 30 can provide the firmware program to the beacon device 10 according to a request from the beacon device 10.

The main configuration and operating method of the beacon device 10 will be described in more detail later. A processor installed in the beacon device 10 or the terminal 20 and the service device 30 according to an embodiment of the present invention can process program instructions for performing the method of the present invention. In one implementation, the processor may be a single-threaded processor. In another implementation, the processor may be a multi-threaded processor. Further, the processor can process instructions stored in the memory or a storage device.

In addition, the communication network according to an embodiment of the present invention may be various types of communication networks.

For example, the communication network may be a wireless communication system such as WLAN (Wireless LAN), WiFi, Wibro, Wimax, HSDPA (High Speed Downlink Packet Access) and so on, or a wired communication system such as Ethernet, xDSL (ADSL, VDSL), HFC (Hybrid Fiber Coaxial Cable), FTTC (Fiber To The Curb), FTTH (Fiber To The Home) and so on. In the above-mentioned communication systems, the communication network may include all types of communication systems which are well known in the art or will be developed in the future.

Hereinafter, the main configuration and operating method of the beacon device 20 according to an embodiment of the present invention will be described.

Figure 2:
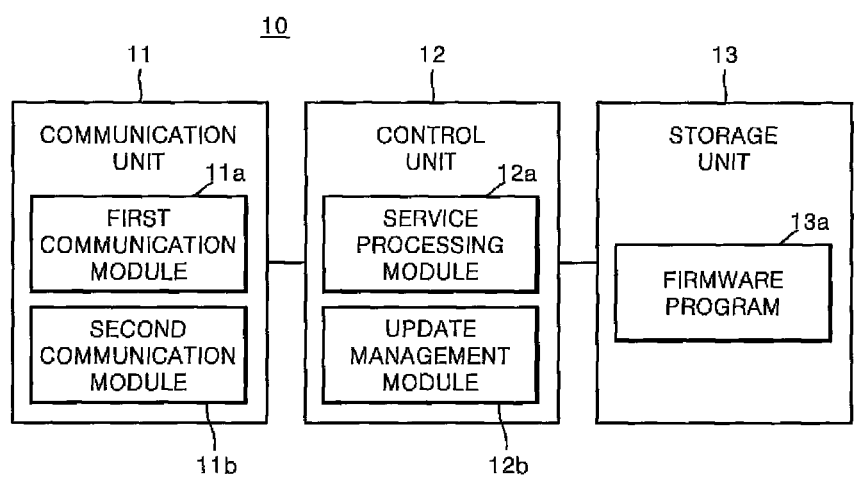
FIG. 2 is a block diagram showing the main configuration of a beacon device shown in FIG. 1 according to an embodiment of the present invention.

FIG. 2 is a block diagram showing the main configuration of the beacon device according to an embodiment of the present invention.

Referring to FIGS. 1 and 2, the beacon device 10 according to an embodiment of the present invention may include a communication unit 11, a control unit 12 and a storage unit 13.

These components will be described below in detail. First, the communication unit 11 may include a first communication module 11a and a second communication module 11b. The first communication module 11a broadcasts a beacon signal within a certain radius, scans the broadcast beacon signal, and exchanges information with one or more connected terminals 20. In this case, the first communication module 11a can transmit/receive information according to a Bluetooth communication protocol or a different communication protocol. The second communication module 11b exchanges information with the service device 30. In this case, the second communication module 11b can transmit/receive information according to a WiFi communication protocol or a different communication protocol.

The control unit 12 controls the overall operation of the beacon device 10 and may include at least one processor including CPU (Central Processing Unit)/MPU (Micro Processing Unit), an execution memory (for example, a register and/or RAM (Random Access Memory) into which memory loading data are loaded, and a bus via which the data are input/output to/from the processor and the memory. In addition, the control unit 12 may include predetermined program routines or program data which are loaded from a predetermined recording medium into the execution memory and processed by the processor in order to perform functions defined in the beacon device 10. In other words, functions which can be processed in software among the functions of the beacon device 10 to process the firmware updating method according to an embodiment of the present invention may be regarded as the functions of the control unit 12.

The control unit 12 of the present invention is functionally coupled to at least one element provided to support the firmware updating method according to an embodiment of the present invention. That is, the control unit 12 is functionally coupled to the communication unit 11 and the storage unit 13 and controls a flow of signal for supply of power into the elements and performance of the functions of the elements.

In addition, the control unit 12 can broadcast the beacon signal within a certain radius via the first communication module 11a of the communication unit 11 and can be connected to the terminal 20 to which a response to the beacon signal is transmitted in order to provide a designated service to the terminal 20.

In particular, the control unit 12 according to an embodiment of the present invention can inquire of the service device 30 about a firmware program version at a certain period basis via the second communication module 11b of the communication unit 11 and receive the firmware program version from the service device 30. In this case, the control unit 12 is connected to one or more terminals 20 via the first communication module 11a and, if a service is being provided to the terminal 20, inquires of the service device 30 about a firmware program version at more than a preset period and receives the firmware program version from the service device 30. Otherwise, the control unit 12 can inquire of the service device 30 about the firmware program version at less than the preset period and receive the firmware program version from the service device 30. In other words, if a service is being provided to the terminal 20, the control unit 12 controls the second communication module 11b, which can interlock with the service device 30, to inquire of the service device 30 about the firmware program version at an interval of more than 2 hours, for example, an interval of 3 hours, if the preset period is an interval of 2 hours. Otherwise, the control unit 12 can inquire of the service device 30 about the firmware program version at an interval of less than 2 hours.

Upon receiving the firmware program version from the service device 30, the control unit 12 can compare the firmware program version received from the service device 30 with a firmware program version 13a stored in the storage unit 13. If both program versions are different from each other, the control unit 12 can perform a procedure of update of the firmware program.

At this time, the control unit 12 can check a state of the first communication module 11a of the communication unit 11. If the first communication module 11a is providing a service to one or more terminals 20, the control unit 12 can stop the broadcasting of the beacon signal and wait until the service provision to the corresponding terminal 20 is completed. When the service provision is completed, the control unit 12 can request the service device 30 to update the firmware program. Otherwise, the control unit 12 can stop the beacon signal being broadcast within a certain radius via the first communication module 11a of the communication unit 11 and, at the same time, request the service device 30 to update the firmware program.

In addition, if the control unit 12 is connected to the one or more terminals via the first communication module 11a of the communication unit 11 although no service is being provided to the terminals 20, the control unit 12 can terminate the connection with the terminals 20 by force and then request the service device 30 to update the firmware program.

Thereafter, upon receiving the firmware program from the service device 30 via the second communication module 11b of the communication unit 11, the control unit 12 installs the received firmware program in the storage unit 13.

In other words, when the reception of the firmware program from the service device 30 is completed, the control unit 12 restarts after installing the received firmware program and checks whether or not the firmware program is normally operated. If the firmware program is normally operated, the control unit 12 can perform a procedure of deleting the existing firmware program of the storage unit 13.

In addition, after deleting the existing firmware program through the above-described procedure and installing the firmware program newly received from the service device 30, the control unit 12 requests the first communication module 11a to broadcast the stopped beacon signal.

The control unit 12 may further include a service processing module 12a and an update management module 12b. The service processing module 12a can control broadcasting of the beacon signal within a certain radius via the first communication module 11a of the communication unit 11 and processes provision of information according to a designated service to the terminal 20 which received the beacon signal. The update service device 30 can consistently inquire of the service device 30 about the firmware program version 13a, and, if the version is different from a stored firmware program, support a procedure of deleting the stored firmware program and installing a new firmware program, as described above.

The storage unit 13 can temporarily store application programs required for operation of functions according to an embodiment of the present invention and various data generated during execution of the application programs. In particular, the storage unit 13 according to an embodiment of the present invention can store the firmware program 13a. The storage unit 13 may generally include a program region and a data region. The program region stores and manages information required to operate the beacon device 10, for example, the firmware program 13a. The data region is a region where data generated in use of the beacon device 10 are stored. For example, information on a connected terminal 20 may be stored in the data region.

Examples of the storage unit 13 may include storage media such as a flash memory, a hard disk, a multimedia card micro type memory (for example, a SD or XD memory), RAM, ROM and so on.

The main elements of the beacon device 10 have been described above with reference to FIG. 2. However, all of the elements shown in FIG. 2 are not essential but the beacon device 10 may be implemented by more or fewer elements.

It is also be understood that positions of the main elements of the beacon device 10 shown in FIG. 2 may be changed for the sake of convenience or for other reasons. In addition, although it has been illustrated in the above that the control unit 12 includes the service processing module 12a and the update management module 12b only, without being limited thereto, the control unit 12 may further include different modules performing different functions.

Hereinafter, the main configuration and operating method of the service device 30 according to an embodiment of the present invention will be described.

Figure 3:
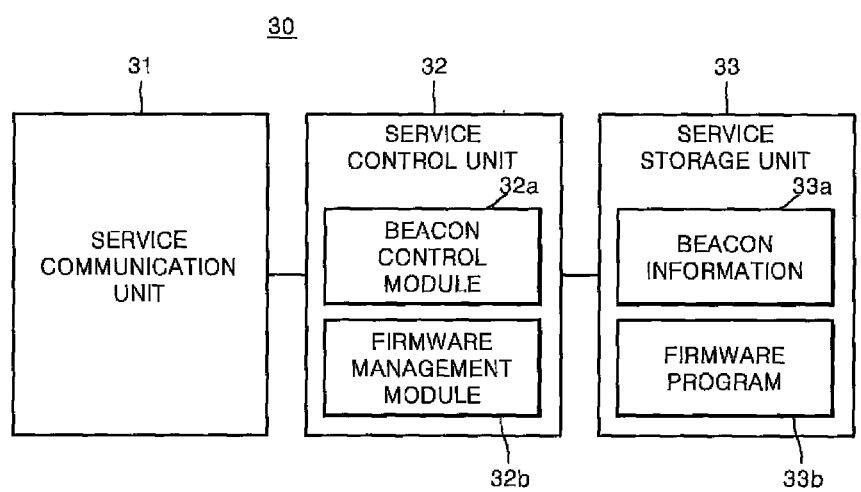
FIG. 3 is a block diagram showing the main configuration of a service device shown in FIG. 1 according to an embodiment of the present invention.

FIG. 3 is a block diagram showing the main configuration of the service device shown in FIG. 1 according to an embodiment of the present invention.

Referring to FIGS. 1 and 3, the service device 30 according to an embodiment of the present invention may include a service communication unit 31, a service control unit 32 and a service storage unit 33.

These components will be described below in detail. First, the service communication unit 31 supports information exchange with one or more beacon devices 10 via the communication network. In particular, the service communication unit 31 of the present invention can transmit information on a version of firmware program at a request from the beacon device 10 and can support transmission of the firmware program to the beacon device 10.

The service control unit 32 performs the overall control of the service device 30 according to an embodiment of the present invention. In particular, the service control unit 32 according to an embodiment of the present invention may include a beacon control module 32a and a firmware management module 32b. Here, the beacon control module 32a performs the overall control for the beacon device 10. For example, the beacon control unit 32a may support a procedure of storing identification information of a newly installed beacon device 10 and information on an installation location, as beacon information 33a, in the service storage unit 33. In addition, the beacon control unit 32a may store and manage information on an offered service, as the beacon information 33a.

The firmware management module 32b consistently updates a firmware program 33b and manages information on a version of firmware programs and an updated program. In addition, the firmware management module 32b can transmit information on a version of current firmware program to the beacon device 10 at a request from the beacon device 10 and can transmit the firmware program to the beacon device 10 at a request from the beacon device 10 to support update of the firmware program in the beacon device 10.

The service storage unit 33 stores all programs according to execution of the functions of the service device 30. In particular, the service storage unit 33 according to an embodiment of the present invention can store the beacon information 33a and the firmware program 33b as described above.

The service storage unit 33 of the present invention may be a repository located in the service device 30 or may be a data storage server which is located out of the service device 30 and is capable of data exchange with the service device 30.

The main configuration and operating method of the service device 30 according to an embodiment of the present invention has been described in the above.

The service device 30 according to an embodiment of the present invention has the same configuration as typical Web servers or network servers in terms of hardware but includes a program module implemented by languages such as C, C++, Java™, Visual Basic™, Visual C™, and the like. The service device 30 may be implemented in the form of a Web server or a network server. In general, the Web server refers to a computer system which is connected to many unspecified clients and/or other servers via an opened computer network such as Internet, receives a task performance request from a client or another Web server, and produces results of the tasking for the request, and computer software (Web server program) installed in the computer system. However, the computer program should be understood to include a series of application programs operating on the Web server and, in some cases, various internally-built databases, in addition to the above-mentioned Web server program. The service device 30 may be implemented by using Web server programs provided to hardware for general servers in different ways depending on operating systems such as DOS, Windows, Linux, Unix, Macintosh and the like. Examples of the service device 30 may include Website and IIS (Internet Information Server) used in Windows environments and CERN, NCSA, APPACH and so on used in Unix environments.

In addition, the service device 30 may be implemented with one or more servers operating with a server-based computing system or a cloud-based computing system. In particular, information transmitted/received through the firmware update system 100 can be provided through a cloud computing function which can be permanently stored in a cloud computing device on Internet. As used herein, the clouding computing refers to a technique for servicing IT (Information Technology) resources, for example, hardware (servers, storages, networks and so on), software (database, security, Web server and so on), services, data and so on, virtualized by utilizing Internet techniques, in an on demand manner, for digital terminals such as desktop computers, tablet computers, notebook computers, netbook computers, smart phones and so on. In the present invention, all information exchanged between one or more beacon devices 10 and the service device 30 can be stored in a cloud computing device on Internet and can be transmitted anytime and anywhere.

Memories equipped in the beacon device 10 or the terminal 20 and the service device 30 store information related to the corresponding devices. In one implementation, the memories are computer-readable media. In one implementation, the memories may be volatile memory units. In another implementation, the memories may be nonvolatile memory units. In one implementation, a storage device is a computer-readable medium. In other different implementations, a storage device may include, but is not limited to, a hard disk, an optical disk or other mass storages.

As used herein, the term 'module' refers to a software component to play a specific role. As one example, the 'module' may include components such as software components, object-oriented software components, class components and task components, processes, functions, attributes, procedures, subroutines, segments of program codes, drivers, data, database, data structures, tables, arrays and variables. Functions provided in components and 'modules' may be combined into fewer components and 'modules' or may be separated into additional components and 'modules'.

Although the exemplary device configurations have been shown and described in the description and the drawings, implementations of the functional operations and subject matters described in the specification may be implemented with different types of digital electronic circuits, computer software, firmware or hardware including the structures and equivalents thereof disclosed in the specification, or one or more combinations thereof. The implementations of the subject matters described in the specification may be implemented as one or more computer program products, in other words, as one or more modules related to computer program instructions encoded to control or execute the operation of the devices of the present invention. Examples of computer-readable media may include a machine-readable storage device, a machine-readable storage substrate, a memory device, a composition of material having an effect on a machine-readable electromagnetic signal, or one or more combinations thereof.

Hereinafter, a beacon firmware updating method according to an embodiment of the present invention will be described.

Figure 4:
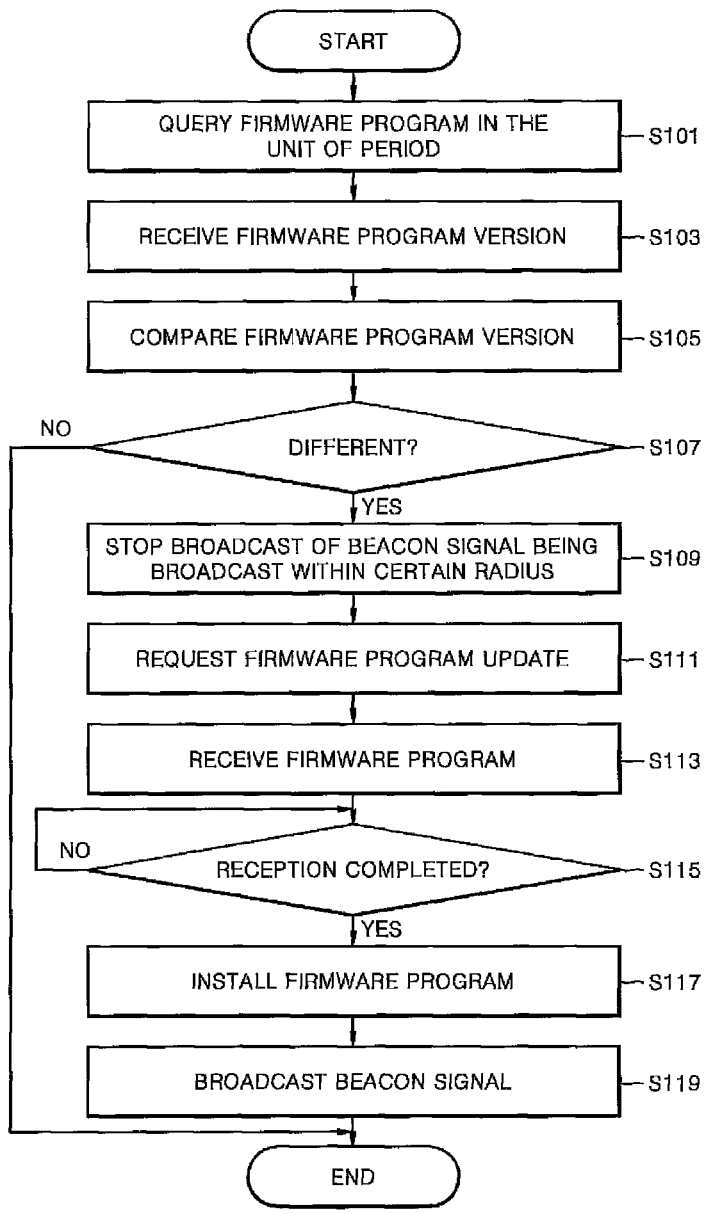
FIG. 4 is a flow chart for explaining a beacon firmware updating method according to an embodiment of the present invention.

FIG. 4 is a flow chart for explaining a beacon firmware updating method according to an embodiment of the present invention.

Referring to FIGS. 1 and 4, the beacon device 10 of the present invention inquires of the service device 30 about a firmware program version on a certain period basis (S101). In response to the inquiry, the beacon device 10 receives a current firmware program version retained by the service device 30 from the service device 30 (S103). Then, beacon device 10 compares a preset firmware program version with the firmware program version received from the service device 30 (S105). If both are different from each other, the beacon device 10 stops the broadcasting of the beacon signal being broadcast within a certain radius (S109) and requests the service device 30 to update the firmware program (S111).

Thereafter, the beacon device 10 receives the firmware program from the service device 30 (S113). When the reception is completed (S115), the beacon device 10 deletes the existing firmware program and performs a procedure of installing the received firmware program (S117) and again broadcasts the beacon signal stopped for the firmware program update (S119).

The above-described beacon firmware updating method of the present invention will be described in more detail below.

Figure 5:
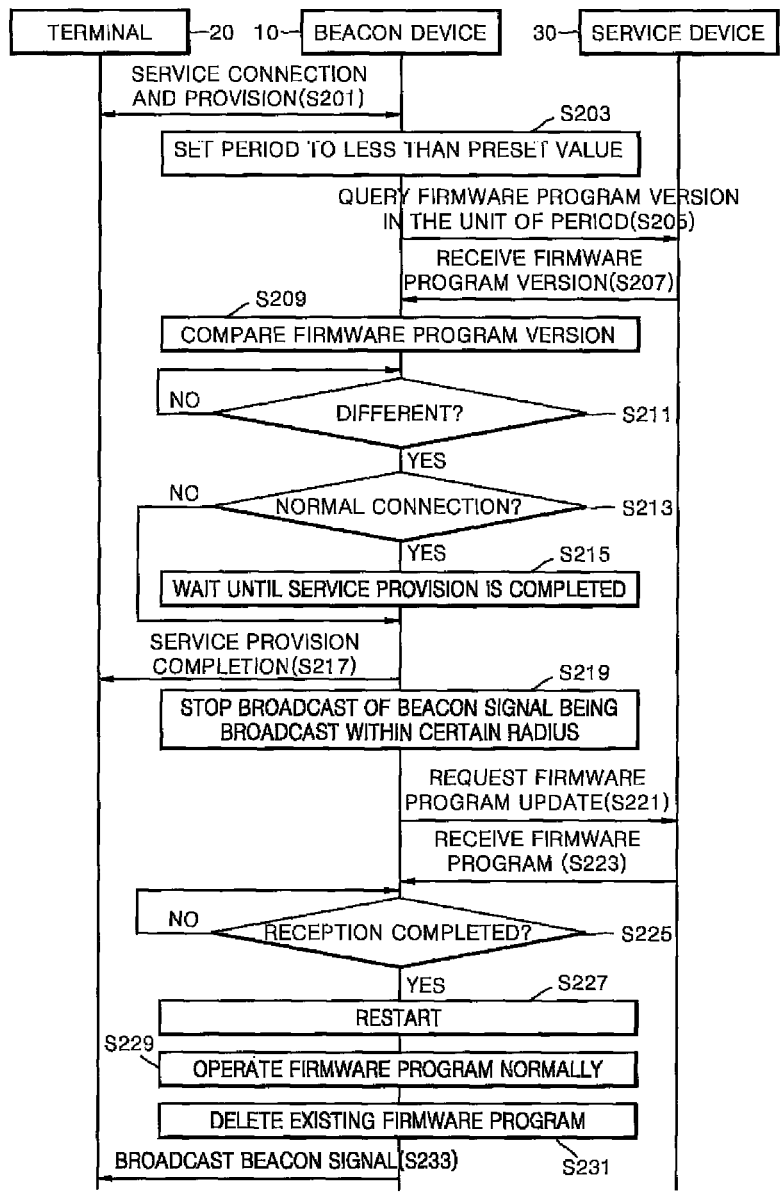
FIG. 5 is a data flow diagram for explaining the beacon firmware updating method in more detail according to an embodiment of the present invention.

FIG. 5 is a data flow diagram for explaining the beacon firmware updating method in more detail according to an embodiment of the present invention.

Referring to FIG. 5, the beacon device 10 can be connected to one or more terminals 20 located within a certain radius and can provide a specified service to the terminal 20 (S201). The specified service may be, for example, an advertisement service or the like provided to the terminal 20 which is located within the certain radius and receives the beacon signal broadcast by the beacon device 10.

In the state where the beacon device 10 is connected to the terminal 20, after setting a period for inquiry of the service device 30 about a firmware program version to more than a preset value (S203), the beacon device 10 inquires of the service device 30 inquires of the service device 30 about the firmware program version (S205). Otherwise, if there exists no terminal 20 connected to the beacon device 10, the beacon device 10 may inquire of the service device 30 about the firmware program version after setting the period to less than the preset value.

Thereafter, the beacon device 10 receives information on the firmware program version retained by the service device 30 from the service device 30 (S207) and compares the received firmware program version with a firmware program version retained by the beacon device 10 (S209). If both are different from each other, the beacon device 10 can perform a firmware updating procedure.

At this time, the beacon device 10 determines whether or not the beacon device 10 is providing a service to one or more terminals. If the connection of the beacon device 20 to the corresponding terminal 20 is normal (S213), the beacon device 10 waits (S215) until the provision of service to the corresponding terminal 20 is completed. If the service provision is completed (S217), the beacon device 10 stops the broadcasting of the beacon signal being broadcast within a certain radius (S219) and can request the service device 30 to update the firmware program. On the other hand, if there exists no terminal 20 connected to the beacon device 10, the beacon device 10 instantly stops the beacon signal being broadcast and, at the same time, can request the service device 30 to update the firmware program. If connection of the beacon device to one or more terminals is maintained although the beacon device 10 provides no service to the terminals 20, which means abnormal connection, the beacon device 10 terminates the connection to the terminals by force and then can request the service device 30 to update the firmware program.

Thereafter, the beacon device 10 receives the firmware program from the service device 30 (S223). When the reception is completed (S225), the beacon device 10 restarts (S227) after installing the received firmware program.

If the installed firmware program is normally operated (S229), the beacon device 10 deletes the existing firmware program (S231). Otherwise, the beacon device 10 may delete the installed firmware program and maintain the existing firmware program.

When the firmware program update is completed through this procedure, the beacon device 10 again broadcasts the stopped beacon signal and can perform the procedure of connection to the terminals 20.

In this manner, according to the beacon firmware program updating method of the present invention, since the beacon device 10 determines whether or not the firmware program update is required, stops the broadcasting of the beacon signal being currently broadcast if it is determined that the firmware program update is required, and updates the firmware program, it is possible to update the firmware program of the beacon device with more ease.

In addition, according to the present invention, when the beacon device 10 is providing a service to a terminal 20 of a particular user, since the beacon device 10 updates the firmware program after waiting such that the service provided to the user terminal 20 is not stopped, it is possible to update the firmware program with higher efficiency. In addition, since an inquiry period can be adjusted depending on conditions of the beacon device 10, it is possible to update the firmware program with higher efficiency.

The beacon firmware program updating method according to an embodiment of the present invention has been described in the above.

As described above, the beacon firmware program updating method of the present invention may be provided in the form of a computer-readable medium suitable to store computer program instructions and data. Examples of the computer-readable medium suitable to store computer program instructions and data may include magnetic media such as a hard disk, a floppy disk and a magnetic tape, optical media such as CR-ROM (Compact Disk Read Only Memory) and DVD (Digital Video Disk), magneto-optical media such as a floptical disk and the like, and semiconductor memories such as ROM (Read Only Memory), RAM (Random Access Memory), a flash memory, EPROM (Erasable Programmable ROM), EEPROM (Electrically Erasable Programmable ROM) and the like. Processors and memories may be supplemented by or integrated into a special purpose logic circuit. Examples of the program instructions may include machine language codes created by a compiler, and high level language codes which can be executed by a computer using an interpreter or the like. These hardware devices may be configured to be operated as one or more software modules to perform the operation of the present invention, and vice versa.

Although details of various particular implementations are set forth in the specification, these details are not intended to limit the scope of the invention or subject matters but should be understood as descriptions for features unique to particular embodiments of the present invention. Features described in the context of individual embodiments in the specification may be implemented in combination in a single embodiment. Conversely, various features described in the context of single embodiment may be implemented individually or in any proper sub combinations in multiple embodiments. Further, although features are operated in particular combinations and may be delineated as initially claimed so, one or more features may be excluded from the claimed combinations in some cases and the claimed combinations may be changed to sub combinations or modifications thereof.

Likewise, although operations are shown in specific order in the drawings, it should not be understood that these operations have to be performed in the specific order or a sequential manner shown to obtain desirable results or all operations shown have to be performed. In some cases, multitasking and parallel processing may be beneficial. In addition, it should not be understood that separation of various system components in the above embodiments is required for all embodiments but it should be understood that program components and systems described in the above embodiments may be integrated into a single software product or may be packaged into multi-software products.

[Industrial Applicability]

The present invention relates to a method for updating a firmware in a beacon device and more particularly, to a method for updating a firmware in a beacon device, which is capable of allowing a beacon device to determine whether a firmware application is required to be updated, stop broadcasting of a beacon signal being currently broadcast if it is determined that the firmware application is required to be updated, and update the firmware program, and a beacon device and system using the same.

According to the present invention, since the beacon device determines whether or not the firmware program update is required, stops the broadcasting of the beacon signal being currently broadcast if it is determined that the firmware program update is required, and updates the firmware program, it is possible to update the firmware program of the beacon device with more ease. In addition, according to the present invention, when the beacon device is providing a service to a terminal of a particular user, since the beacon device updates the firmware program after waiting such that the service provided to the user terminal is not stopped, it is possible to update the firmware program with higher efficiency. The present invention has industrial applicability since it can contribute to development of beacon service industries, has sufficient commercial availability and operation performance and can be practiced in reality.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A beacon device comprising:
   a communication unit which broadcasts a beacon signal within a certain radius according to a Bluetooth protocol system for exchanging information with a service device if required; and
   a control unit which inquires of the service device about a firmware program version on a predetermined period basis relative to the period of broadcast signal from the communication unit, receives the firmware program version from the service device, compares a preset firmware program version with the received firmware program version, controls the communication unit to stop broadcasting of the beacon signal being broadcast within the certain radius if both versions are different from each other, requests the service device to update the firmware program through the communication unit, and installs the firmware program received from the service device through the communication unit
   wherein the control unit compares a preset firmware program version with the received firmware program version, stops broadcasting of the beacon signal if both versions are different from each other and if a service is being provided to one or more terminals through the communication unit, waits until the service provision to the terminals is completed, requests the service device to update the firmware program when the service provision is completed, and, otherwise, requests the service device to update the firmware program at the same time of stopping the broadcasting of the beacon signal.

2. The beacon device according to claim 1, wherein the communication unit includes:
   a first communication module which broadcasts the beacon signal within the certain radius, scans the broadcast beacon signal and exchanges information with connected one or more terminals; and
   a second communication module which exchanges information with the service device.

3. The beacon device according to claim 1, wherein the control unit inquires of the service device about the firmware program version at more than a preset period if a service is being provided to the one or more terminals through the communication unit, and receives the firmware program version from the service device, and, otherwise, inquires of the service device about the firmware program version at less than the preset period, and receives the firmware program version from the service device.

4. The beacon device according to claim 1, wherein, if the control unit is connected to the one or more terminals through the communication unit although no service is provided to the one or more terminal, the control unit requests the service device to update the firmware program after terminating the connection to the terminals by force.

5. The beacon device according to claim 1, wherein, when the reception of the firmware program from the service device is completed, the control unit installs the received firmware program, restarts to check whether or not the firmware program is normally operated, and deletes an existing firmware program if the firmware program is normally operated.

6. The beacon device according to claim 1, wherein the control unit controls the communication unit to broadcast the stopped beacon signal after installing the firmware program.

7. A firmware updating system comprising:
- a service device which manages one or more beacon devices and manages a firmware program which can be provided to the beacon devices for broadcasting a beacon signal within a certain radius according to a Bluetooth protocol system; and
- a beacon device which inquires of the service device about a firmware program version on a predetermined period basis relative to the period of the broadcast beacon signal, receives the firmware program version from the service device, and includes a control unit for comparing a preset firmware program version with the received firmware program version with the control unit stopping broadcasting of said beacon signal if both program versions are different from each other and if a service is being provided by a beacon device to one or more terminals, waits until the service provision to the terminals is completed, requests the service device to update the firmware program when the service provision is completed, and, otherwise, requests the service device to update the firmware program at the same time of stopping the broadcasting of the beacon signal and installs the firmware program received from the service device.

8. A beacon firmware updating method using a beacon device for broadcasting a beacon signal, a control unit and a service device to carry out the method with the firmware updating method comprising:
- having the beacon device inquire of the service device about a firmware program version at a predetermined period basis relative to the period of the broadcast beacon signal;
- receiving, by the control unit of the beacon device, the firmware program version from the service device;
- using the control unit for comparing a preset firmware program version with the firmware program version received from the service device;
- using the control unit to stop the broadcasting of a beacon signal from the beacon device within a certain radius according to a Bluetooth protocol system if both of the compared program versions are different from each other and requesting the service device to update the firmware program; and
- installing, by the control unit of the beacon device, the firmware program received from the service device,
- wherein the act of inquiring of a service device about a firmware program version includes inquiring of the service device about the firmware program version at more than a preset period if the beacon device is providing a service to one or more terminals and, otherwise, inquiring of the service device about the firmware program version at less than the preset period, and
- wherein the act of requesting the service device to update the firmware program includes stopping the broadcasting of the beacon signal if the beacon device is providing a service to one or more terminals, waiting until the service provision to the terminals is completed, requesting the service device to update the firmware program when the service provision is completed, and, otherwise, requesting the service device to update the firmware program after stopping the broadcasting of the beacon signal.

9. The beacon firmware updating method according to claim 8, wherein the act of requesting the service device to update the firmware program includes, if the beacon device is connected to one or more terminals although no service is provided to the one or more terminal, requesting the service device to update the firmware program after terminating the connection to the terminals by force.

10. The beacon firmware updating method according to claim 8, wherein the act of installing the firmware program includes:
- installing, by the beacon device, the firmware program received from the service device, when the reception of the firmware program from the service device is completed;
- performing, by the beacon device, restart;
- checking, by the beacon device, whether or not the firmware program received from the service device is normally operated; and
- deleting, by the beacon device, an existing firmware program if the received firmware program is normally operated.

11. The beacon firmware updating method according to claim 8, further comprising:
- starting, by the beacon device, broadcasting of the stopped beacon signal after the act of installing the firmware program.

* * * * *